Aug. 10, 1965

R. S. KAMPF 3,200,405

RECORDER

Filed Dec. 9, 1963

INVENTOR.
RICHARD S. KAMPF

BY Arthur H. Swanson

ATTORNEY.

Aug. 10, 1965          R. S. KAMPF          3,200,405
                        RECORDER
Filed Dec. 9, 1963                    2 Sheets-Sheet 2
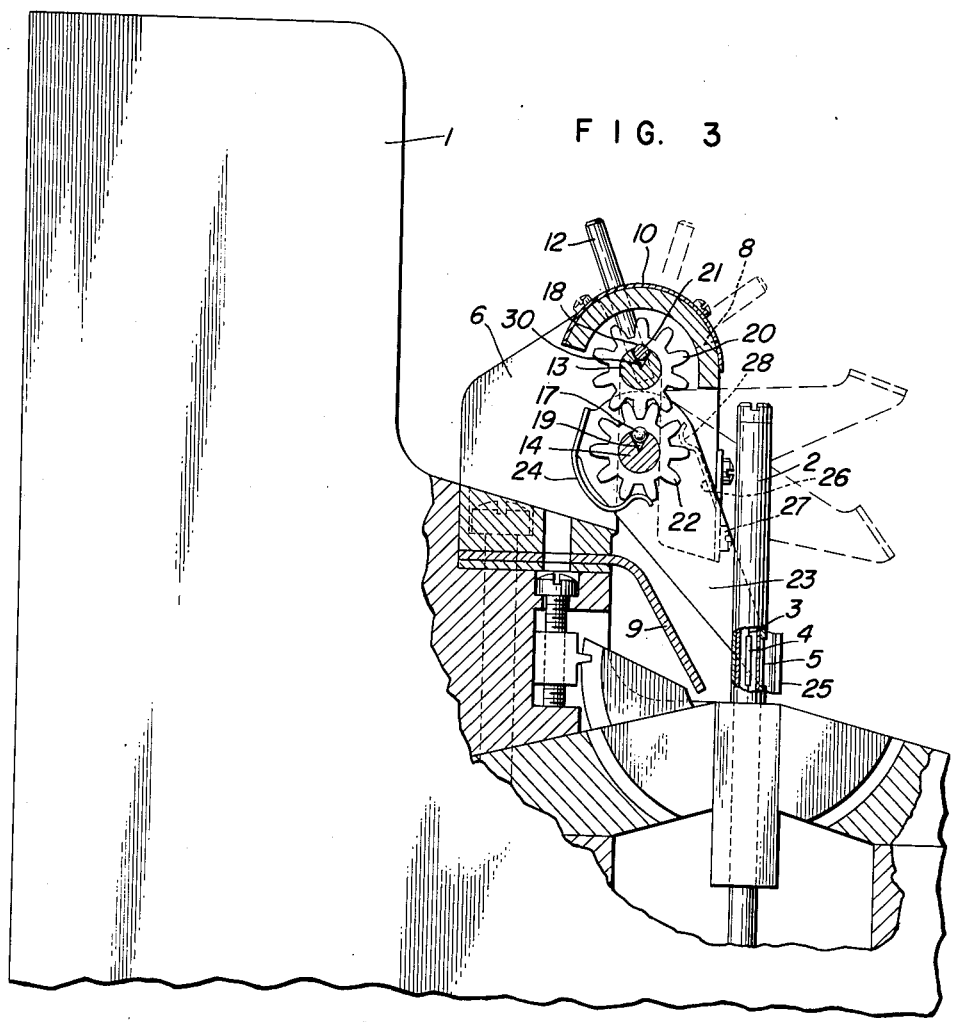
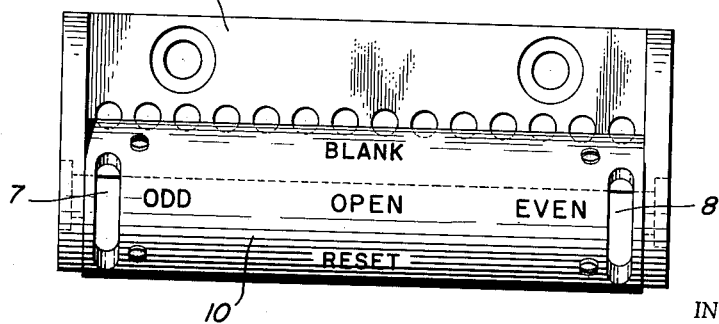
INVENTOR.
RICHARD S. KAMPF
BY
Arthur H. Swanson
ATTORNEY.

United States Patent Office 3,200,405
Patented Aug. 10, 1965

3,200,405
RECORDER
Richard S. Kampf, Costa Mesa, Calif., assignor to Honeywell Inc., a corporation of Delaware
Filed Dec. 9, 1963, Ser. No. 328,879
6 Claims. (Cl. 346—109)

This invention relates to recording oscillographs which employ a plurality of galvanometers (hereinafter abbreviated galvo). Each galvo makes a record on a recording medium, such as a strip of sensitized paper, by reflecting radian energy, such as light, from a source of light onto the recording medium and deflecting the mirror of the galvo so that the spot at which the light strikes the recording medium varies in accordance with the variations of the variable to be recorded.

It is an object of this invention to provide means for shadowing or blanking one or more galvos from incident light so that it cannot produce a trace.

An additional object of this invention is to provide means whereby groups of galvos may be blanked out simultaneously by one simple operation.

A better understanding of the present invention may be had from the following detailed description when read in connection with the accompanying drawings, in which:

FIG. 3 is an end view with parts broken away in transverse, vertical, cross section on line 3—3 of FIG. 2 as viewed in the direction of the arrows.

FIG. 4 is a top or plan view of the cover 10.

Figure 1:
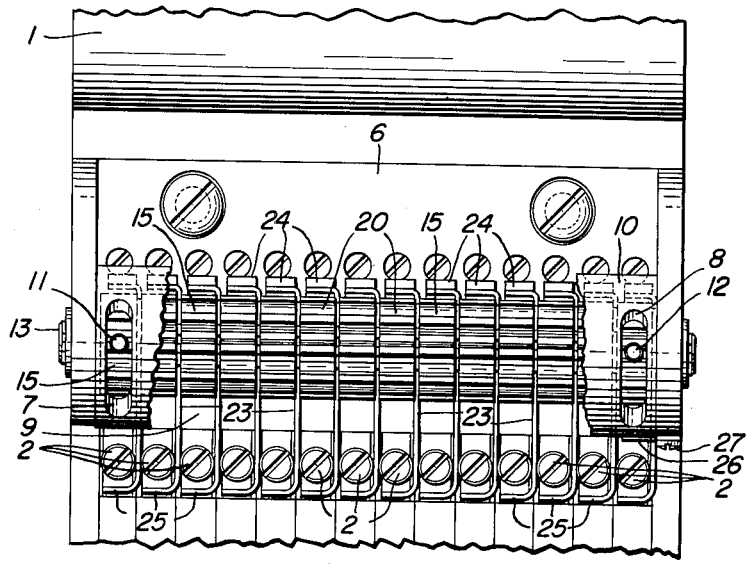
FIG. 1 is a top or plan view with parts broken away to permit the scale of the drawing to be increased.

The oscillographic recorder of this invention comprises a galvo bank 1 which has a number of holes in it. Pencil galvanometers 2 may each be placed in one of these holes, so that the suspensions 3, on which the mirrors 4 are mounted, each oscillates about a vertical axis. Mirrors 4 are each opposite an opening in which may be mounted a galvo-lens 5. A galvo-coil (not shown) oscillates galvo-mirror 4.

Light or other radiant energy from a source (not shown) is focused on each of the galvo-mirrors 4 so that, when the galvo-mirrors 4 are oscillated about the vertical axis on which they are mounted, the incident beam of light is deflected in a horizontal plane and is focused on a recording means (not shown) to produce a record in the form of a trace or image thereon.

The means for shadowing or blanking each of the galvos from the incident light so that it cannot produce a trace comprises a base casting 6 mounted on the galvo-bank 1 and having slots 7 and 8 through its upper surface. A shield 9 is mounted between the base casting 6 and the galvo-bank 1. A cover 10 in the form of a decalcomania is mounted on an upper portion of the base casting 6 to provide legends or markings thereon.

Through the openings 7 and 8 in the base casting 6 project levers 11 and 12 which rotate first shaft 14 and second shaft 13, respectively. Each galvo has associated with it means for shadowing or blanking it by shutting off the incident light therefrom. These means fall into two groups, each group containing identical elements, so that only one example of each group will be described.

Figure 2:
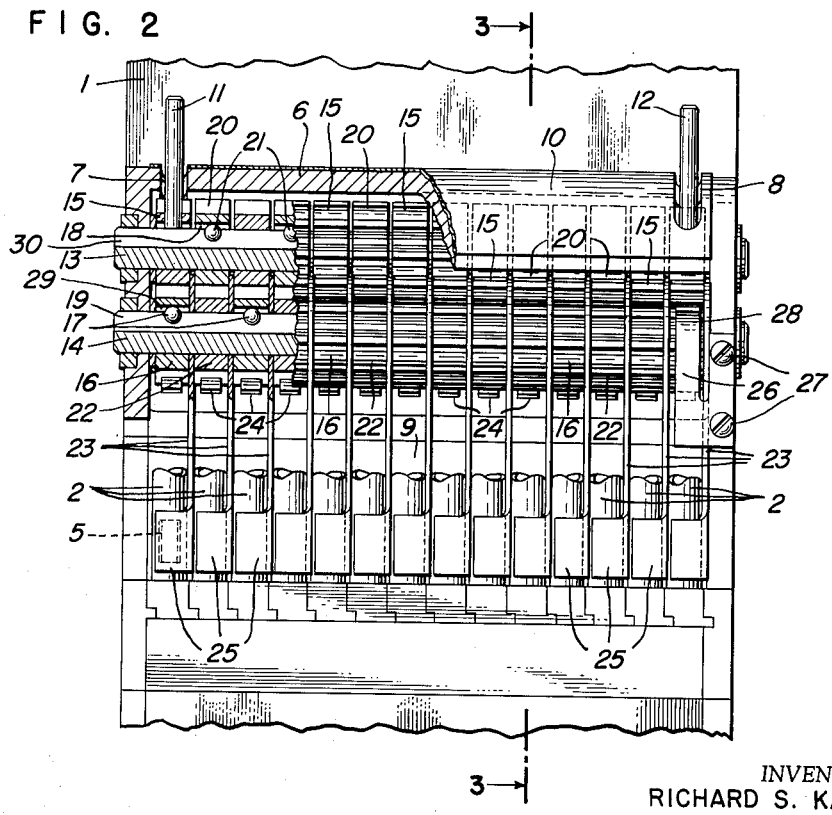
FIG. 2 is a partial, front elevation with parts broken away in longitudinal, vertical, cross section.

Lever 11 (FIGS. 1 and 2) is secured to a gear 15 which is mounted for rotation on shaft 13. Shaft 13 is free for rotation on base casting 6. Gear 15 meshes with gear 16, which is fast on shaft 14, by means of a ball 17, which is secured in a semi-circular opening 29 in gear 16 and in a V-shaped slot 19 in shaft 14.

A spring 26 is secured, as by screws 27, to the front of one side plate of galvo-bank 1. Spring 26 has a curved portion 28 (FIG. 3) which rests against the last gear on shaft 14 and, therefore, yieldingly holds shaft 14 in each of the three positions hereinafter mentioned. Another spring, which is a mirror image of spring 26, is mounted on the left side plate of galvo-bank 1. However, this spring is omitted from the drawing, so that the gearing beneath it can be visible.

Associated with each galvo is one of a number of blankers 23 each of which is mounted for rotation on shaft 14. Each blanker 23 has a spring portion 24 which meshes with the teeth of a gear 22 or of a gear 16 and acts as a detent engaging the gear teeth so that the blanker is yieldingly held in one of three positions. Each blanker 23 has a portion 25 adapted to overlie or to be moved away from the galvo-lens 5.

Lever 12 is fast on shaft 13. Gear 20 is also fast on shaft 13 by means of ball 21 which fits in a semi-circular opening 18 in gear 20 and in V-shaped slot 30 in shaft 13. Gear 20 meshes with gear 22, which is free to rotate on shaft 14.

Referring to FIG. 3, if the device is in the "blank" position (in which it is shown in full lines) the portion 25 of blanker 23 overlies the galvo-mirror 5 and shadows or blanks the galvo-mirror 4 from any incident light falling thereon. This galvo is therefore blanked out and cannot produce a trace or record. If lever 12 is moved clockwise, as seen in FIG. 3, to the "open" position, the gear 20 rotates gear 22, thereby causing blanker 23 to be rotated so that the portion 25 of the blanker is lifted from in front of the galvo-lens 5. The galvo is therefore no longer shadowed or blanked and can produce a record.

If the lever 12 is again turned clockwise, as seen in FIG. 3, gear 20 rotates gear 22 and rotates blanker 23 to a third or "reset" position.

Referring to FIG. 3, if lever 11 is rotated from the position in which it is aligned with lever 12, in a clockwise direction, gear 15 and gear 16, which meshes with gear 15, are also rotated. This rotation shifts the blanker 23 from the "blank" position, in which the portion 25 of the blanker 23 overlies the galvo-mirror 5, to the "open" position, in which the blanker portion 25 is removed from in front of the galvo-lens 5. If the lever 11 is again rotated in a clockwise direction, as seen in FIG. 3, the same sequence of events takes place and the blanker 23 is moved from the "open" position to the "reset" position.

It will be noted that the gears 15 and 20, and the gears 16 and 22 are arranged alternately along shaft 13 and shaft 14, respectively. This permits lever 11 to operate all the blankers 23 driven by the gears 15 and 16 and permits lever 12 to operate all the blankers 23 driven by the gears 20 and 22. Thus, half the total number of blankers can be operated by lever 11 and half can be operated by lever 12.

By moving the levers 11 and 12 to the "reset" position all the blankers 23 are aligned or reset and all can then be moved back to the "blank" position when the levers 11 and 12 are moved to the "blank" position.

If it is desired to blank one or more of the galvos, the operating levers 11 and 12 are place in the "open" position. Then, the blanker 23 for any galvo 2 that is not to be blanked is lifted to the "reset" position while the blankers 23 for the galvos 2 to be blanked are left in the "open" position. When the lever 11 or 12 is moved to the "blank" position only the desired galvos are shadowed.

What is claimed is:

1. In an oscillograph for recording the time-variations of electric phenomena, a source of radiant energy, a recording sheet responsive to said radiant energy to produce a trace thereon, means for moving said sheet at a predetermined speed, a plurality of galvanometers, each having a coil responsive to one of said time-variations, means including a mirror movable with each of said coils and acting to cause said radiant energy to move as a pointer in unison with the movements of said coil and to impinge upon said recording sheet and produce a trace thereon, a pair of handles mounted on said oscillograph for movement thereon, a pair of trains of gears each mounted on said oscillograph for movement in response to movement of one of said handles, and a pair of blankers each mounted for movement on said oscillograph in response to movement of one of said trains of gears and each having an opaque portion adapted to be moved to a first position, in which it is located between said source of radiant energy and one of said mirrors to prevent the passage of radiant energy from said source to said one mirror, and to a second position permitting passage of said radiant energy from said source to said one mirror.

2. In an oscillograph for recording the time-variations of electrical phenomena, a source of radiant energy, a recording sheet responsive to said radiant energy to produce a trace thereon upon incidence of such radiant energy thereon, means for moving said sheet at a predetermined speed, a galvanometer having a coil responsive to said time-variations, a mirror movable with said coil to reflect said radiant energy and to cause it to move as a pointer with the movements of said coil and to impinge upon said recording sheet to produce a trace thereon, a handle mounted on said oscillograph for movement thereon, a train of gears mounted for movement on said oscillograph and responsive to said movements of said handle, a shaft mounted on said oscillograph and having one of the gears of said train mounted thereon and affixed thereto against rotation relative to said shaft, a spring mounted on said oscillograph and bearing against the teeth of said gear on said shaft so as to serve as a spring detent to hold said shaft in various positions, and a blanker mounted for movement on said oscillograph in response to movements of said handle and said train of gears and having an opaque portion adapted to cover or uncover said mirror so as to prevent or permit the passage of radiant energy from said source to said mirror.

3. In an oscillograph including a source of radiation and a plurality of galvanometer mirrors, each of which is arranged to receive radiation from said source and to reflect an individual beam of radiation onto a record medium, the improved selective blanking arrangement for said mirror including a moveable drive means moveable between first and second positions, a separate blanker individual to each of said mirrors and moveable between a blank position, in which it effectively interrupts the beam of the associated mirror, an open position, in which it does not interrupt the last-mentioned beam, and a reset position, in which it does not interrupt said last-mentioned beam, a separate coupling means individual to each of said blankers and coupling the associated blanker to said drive means so that the movement of said drive means imparts movement to said blankers, and yieldable means included in each of said coupling means to permit the corresponding one of said blankers to be adjusted relative to said drive means between a normal state, wherein the movement of said drive means from said first position to said second position moves said one blanker from said open position to said blank position, and a non-blanking state, wherein the movement of said drive means from said first position to said second position moves said one blanker from said reset position to said open position.

4. Apparatus as specified in claim 3, wherein the adjustment of any of said blankers into said reset position relative to said drive means when the latter is in said first position adjusts the last-mentioned blanker into said non-blanking state.

5. Apparatus as specified in claim 3, wherein said drive means in movable into a third position, and wherein the movement of said drive means into said third position moves all of said blankers to said reset position and adjusts all of said blankers into said normal state.

6. In an oscillograph including a source of radiation and a plurality of galvanometer mirrors positioned in a row, each of which is arranged to receive radiation from said source and to reflect an individual beam of radiation onto a record medium, the improved selective blanking arrangement for said mirrors including first and second moveable drive means, each of which is separately moveable between first and second positions, a separate blanker individual to each of said mirrors and moveable between a blank position, in which it effectively interrupts the beam of the associated mirror, and an open position, in which it does not interrupt the last-mentioned beam, said blankers being positioned in a row corresponding to said row in which said mirrors are positioned, and coupling means coupling every alternate one of said blankers in said row thereof to said first drive means, and coupling the remaining ones of said blankers to said second drive means, to cause movement of said first drive means between said first and second positions to move said alternate ones of said blankers between said open and blank positions, and to cause movement of said second drive means between said first and second positions to move said remaining ones of said blankers between said open and blank positions.

References Cited by the Examiner

UNITED STATES PATENTS

| 2,535,065 | 12/50 | Heiland | 346—109 |
| 2,721,783 | 10/55 | Higbee et al. | 346—145 |
| 2,791,483 | 5/57 | Adams | 346—145 |

LEO SMILOW, *Primary Examiner.*